(12) United States Patent
Viswanathan (10) Patent No.: US 7,190,819 B2
(45) Date of Patent: Mar. 13, 2007

(54) IMAGE-BASED MEDICAL DEVICE LOCALIZATION

(75) Inventor: Raju R. Viswanathan, St. Louis, MO (US)

(73) Assignee: Stereotaxis, Inc., St. Louis, MO (US)

( * ) Notice: Subject to any disclaimer, the term of this patent is extended or adjusted under 35 U.S.C. 154(b) by 186 days.

(21) Appl. No.: 10/977,488

(22) Filed: Oct. 29, 2004

(65) Prior Publication Data

US 2006/0093193 A1    May 4, 2006

(51) Int. Cl.
 *G06K 9/00* (2006.01)
(52) U.S. Cl. .................................... 382/128; 600/434
(58) Field of Classification Search ................ 382/128, 382/132, 224, 254–258, 274; 600/434
See application file for complete search history.

(56) References Cited

U.S. PATENT DOCUMENTS

| 5,289,373 A | * | 2/1994 | Zarge et al. ................. 600/434 |
| 6,241,671 B1 | | 6/2001 | Ritter et al. |
| 6,571,004 B1 | * | 5/2003 | Florent et al. .............. 382/128 |
| 2004/0068173 A1 | | 4/2004 | Viswanathan |

* cited by examiner

*Primary Examiner*—Jingge Wu
*Assistant Examiner*—Tom Y. Lu
(74) *Attorney, Agent, or Firm*—Harness, Dickey & Pierce, P.L.C.

(57) ABSTRACT

A method of identifying an elongate medical device in a two-dimensional image of an operating region includes filtering pixels meeting a predetermined intensity requirement for linear scaling, dividing the filtered pixels into groups of contiguous pixels, and selecting from the groups a group corresponding to the medical device.

39 Claims, 7 Drawing Sheets

IMAGE-BASED MEDICAL DEVICE LOCALIZATION

BACKGROUND OF THE INVENTION

Interventional medical applications have seen a rapid growth in recent years. A variety of techniques and devices for minimally invasive therapies have become commonplace. Of particular note is the emergence of remote navigational systems that offer precise control and steering for medical device navigation. An example of such a system is the Niobe™ Magnetic Navigation System commercialized by Stereotaxis, Inc.

In such a system, the distal tip of the device is remotely actuated from an external User Interface. If the location of the device tip within the anatomy is known, the steering of the device as it is navigated through the anatomy can be automated. Commercially available localization systems such as the CARTO™ EP Navigation System manufactured by Biosense Webster, Inc. can accurately determine the three dimensional location and orientation of a medical device that is equipped with a location sensor. This system requires specialized equipment including a set of signal transmission coils, and also requires the medical device to be suitably equipped with a sensor. Other localization systems can localize devices with metal electrodes by sensing electric field gradients. However, incorporating such specialized sensors or electrodes is not always feasible with every medical device.

For instance, thin medical devices such as guide wires are quite small in diameter, and it is difficult to incorporate useful sensors at such small length scales. Fluoroscopic imaging is used as a standard imaging modality in the Catheterization Laboratory (Cath Lab) for interventional medical procedures. Given this standard practice, there is a need to have a localization method that can directly localize the medical device based on normally acquired Fluoroscopic (X-ray) images. The present invention addresses this need.

SUMMARY OF THE INVENTION

Generally the invention relates to methods and apparatus for localizing an elongate medical device in an operating region, in particular localizing an elongate medical device in an operating region by processing an image of the operating region. In a preferred embodiment, the method comprises processing a Fluoroscopic or X-ray image or sequence of images to identify a segment or portion of an elongate medical device.

DETAILED DESCRIPTION OF THE PREFERRED EMBODIMENT

An elongate medical device is visible on fluoroscopic images when its radio-opacity is sufficiently high, so that it is visible as a darker object against a lighter background. Thus, there is a local contrast difference that is in principle detectable at the level of the pixels that make up the image. For typical elongate devices of the type commonly employed in interventional medical applications, the shape of the device can be thought of as effectively one dimensional. This topological property means that the distribution of darker pixels that make up the fluoro-visible portion of the device can be analyzed to extract the device.

For example, a medical guide wire can be localized in the three-dimensional space of an operating region in a subject through the image processing of a two dimensional image, such as a fluoroscopic image, of the operating region. While this is invention is described and illustrated in connection with a medical guide wire, the invention is not limited to the particular guide wire, or to guide wires generally, but could apply to other elongate medical devices, such as catheters, stents, balloon catheters, etc. Furthermore, while the image used is a x-ray image, the invention is not so limited and some other imaging modalities could be used depending on the clinical application.

The method generally comprises the steps of identifying a set of pixels satisfying a set of criteria, applying a specialized filter to this set of pixels, performing a specialized grouping operation, and applying at least one more level of further specialized filter to the data so obtained.

The image of the operating region can, in general, be thought of as an M×N matrix of pixel intensities. Typically, X-ray systems output images of size 1024×1024 pixels, although this can vary depending on the system. In the preferred embodiment, each column of the matrix of intensities is scanned for a small segment {s} of contiguous pixels, of length $L_0$ whose average pixel intensity is below a pre-determined threshold t as compared to the average intensity of segments of length L on either side of {s}, provided that the average pixel intensity in {s} is itself below a threshold p. All the center pixels of each such segment found are marked. The parameters $L_0$ and L could have values depending on the type of device being identified and the type of imaging equipment being used. They could also depend on the contrast level in the image. In a preferred embodiment, $L_0$ and L could have values each lying in the range 1 to 12 pixel units.

The process is repeated for the rows of this matrix and more pixels are marked in a similar manner.

As an example, in percentage terms the variation in local intensity expressed by the threshold t could have a value in the range 3–220 percent. The threshold p could be defined in absolute terms of pixel intensity in one preferred embodiment. In another preferred embodiment the threshold p could be defined based on a monotonic function of the minimum intensity in the image. In a third preferred embodiment the threshold p could be defined based on a local average of intensity over a local region surrounding each pixel. In a fourth preferred embodiment the threshold p could be defined based on a local average over a local region surrounding a small group of pixels near the pixel of interest.

In a fifth embodiment the threshold could be chosen to depend on the average intensity within the entire image. The threshold p can also be established in other ways.

The marked pixels in general include pixels corresponding to the device, and others consisting of "noise" or undesired pixels. Since the medical device in the image is effectively one-dimensional in topology, a scaling analysis is employed to identify pixels that satisfy a scaling criterion. A one-dimensional distribution of points in an image has the property that the number of points locally scales linearly with the local size of region examined.

The number of pixels in several different sized regions of similar shape centered about each representative pixel comprises determining the number of points in at least three differently sized regions. The shape is preferably rectangular, and more preferably square.

Figure 7:
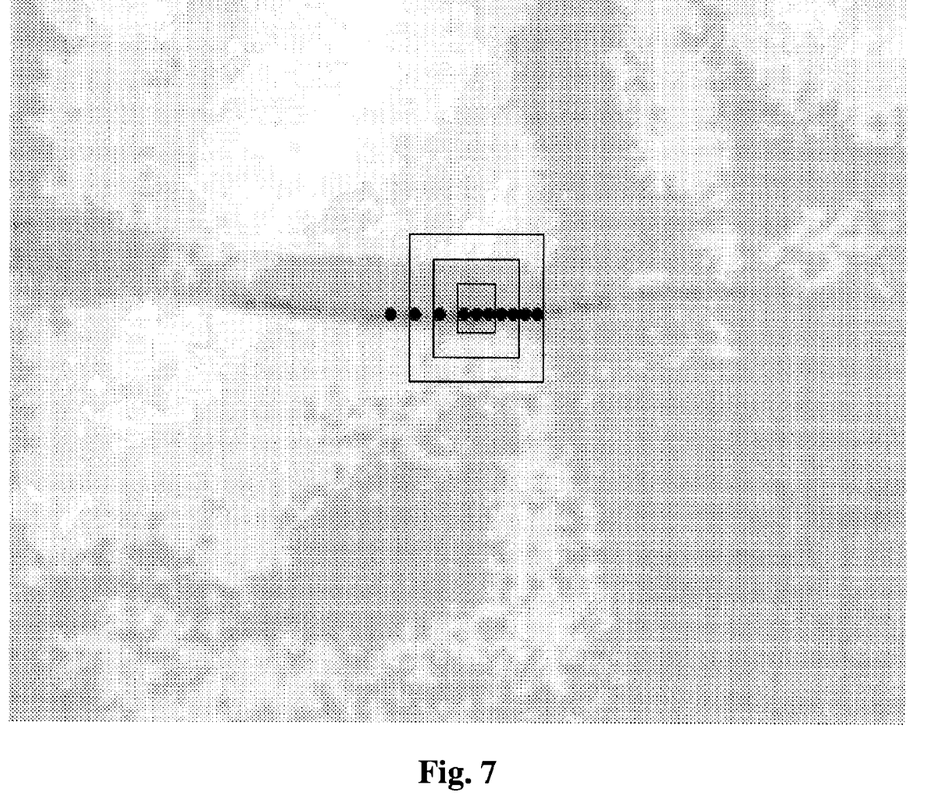
FIG. 7 is an enlarged portion of an X-ray image showing a guidewire with pixels marked according to the method described herein and showing the process of filtering the marked pixels.

For every pixel marked in the scanning step, the numbers of points in squares of size 3×3, 5×5 and 7×7 (in pixel units) centered about that pixel are checked to identify this expected linear scaling pattern, to within a certain error. As a non-limiting example, in one embodiment if $n_3$, $n_5$ and $n_7$ are the respective numbers of points in these squares, one would expect to find $$|(n_3/3 - n_5/5)| < \epsilon$$

$$|(n_3/5 - n_5/7)| < \epsilon$$

where $\epsilon$ is a suitably defined threshold that typically lies in the range 0 to 2. Other methods to check for approximately linear scaling and other thresholds could be used as would be familiar to those skilled in the art. Likewise other types of pixel neighborhoods and other sizes can be used depending on convenience and on the application, and the example given here is for illustration purposes only. Marked pixels from the scanning step that satisfy the scaling relationship are retained; those that do not are discarded.

This step is in effect a filter that discards pixels that do not scale correctly. A major fraction of noise in the image that could otherwise interfere with the detection process is discarded in this manner.

The marked and filtered pixels {f} now typically consist of groups of pixels corresponding to the device, and occasionally could also include small local regions that scale correctly but actually arise from noise.

In a preferred embodiment in this step, the filtered, marked pixels {f} are divided into groups of contiguous pixels, such that each group defines a connected region. In a preferred embodiment, marked pixels that are within 5 pixel units of each other are collected together into groups through an exhaustive search process. Alternate numbers of pixel units could be used in the definition of a group based on the type of device that is being identified. In this embodiment the group with the largest number of filtered, marked pixels is the identified device or portion of device. To confirm the correct identification of device the transverse dimension of the device can be extracted from the identified device and this dimension can be verified against a known dimension to confirm the identification. Similarly, the length of identified device can also be verified against a known length dimension from a device database.

In another preferred embodiment, a coarse cell structure is defined where the M×N image is subdivided into smaller cells, for example of cell size 4×4. Each pixel in {f} is assigned to an appropriate cell. The centroids of such assigned distributions in non-empty cells that have more than a pre-defined minimum number of marked pixels are marked as new points {g} at this coarser scale. The pre-defined minimum number of marked pixels per cell for example can be in the range 3 to 10, and sets of contiguous points in {g} are grouped. The centroids are divided into groups of contiguous points by grouping points that are within a predetermined distance of one another. In the preferred embodiment, the predetermined distance corresponds to a length of between 4 and 25 pixel units.

In one preferred embodiment, such groups are analyzed to find end points that are defined from a topological analysis of the neighborhood. Such an analysis for example can identify points such that all neighboring points within a prescribed distance range lie within a wedge-shaped region. Once an endpoint is identified, successively moving to the nearest point within the group traces out a curvilinear segment that is identified as the device. In another embodiment, the curvilinear segment is identified as a device based on known device dimensions such as length or other geometrical properties such as curvature. Segments that do not satisfy a minimum length or other suitable geometrical criterion are discarded to resolve any ambiguities if they arise.

Figure 1:
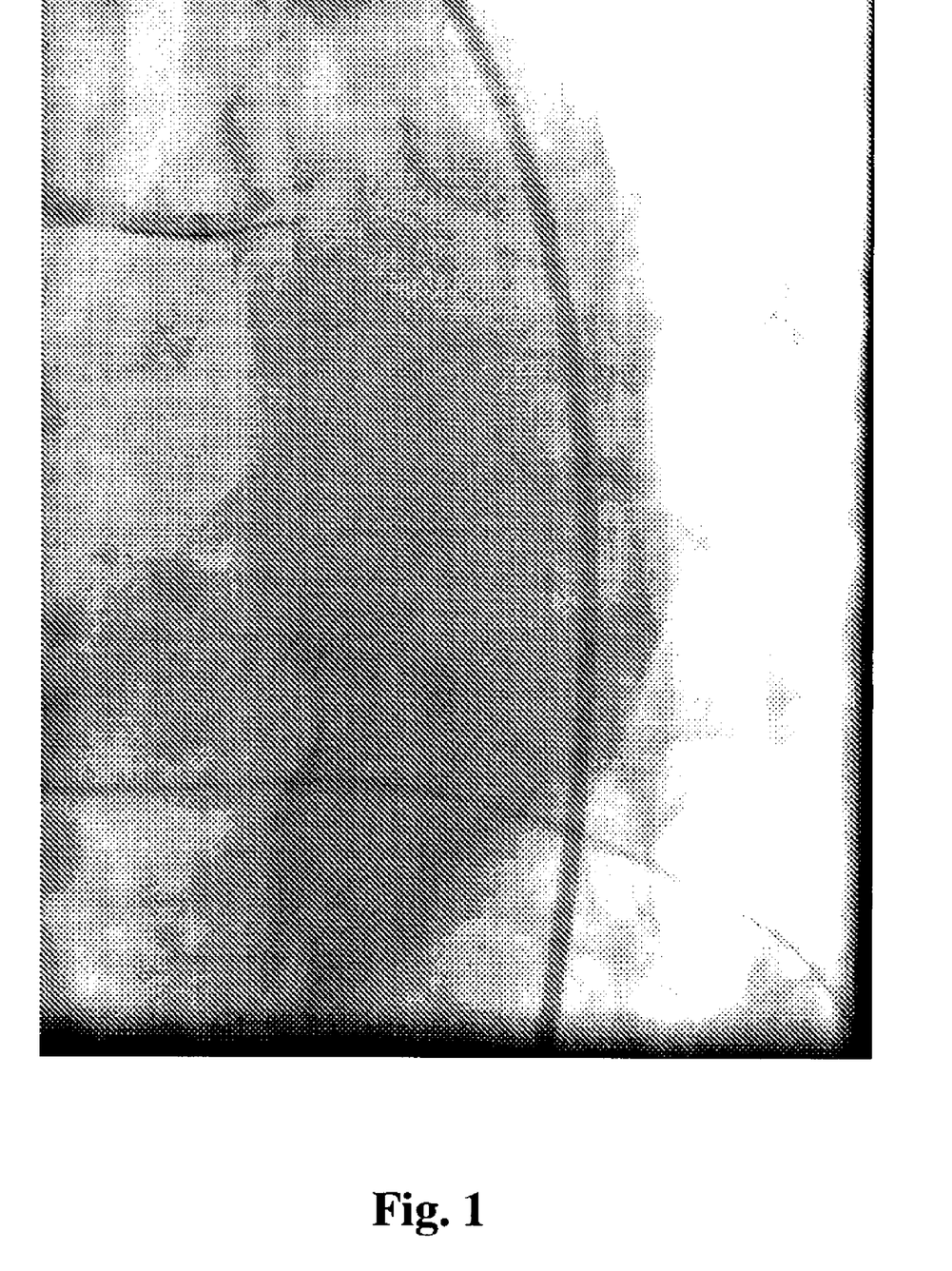
FIG. 1 is an x-ray image of an operating region in a subject, showing a guide wire therein.
Figure 2:
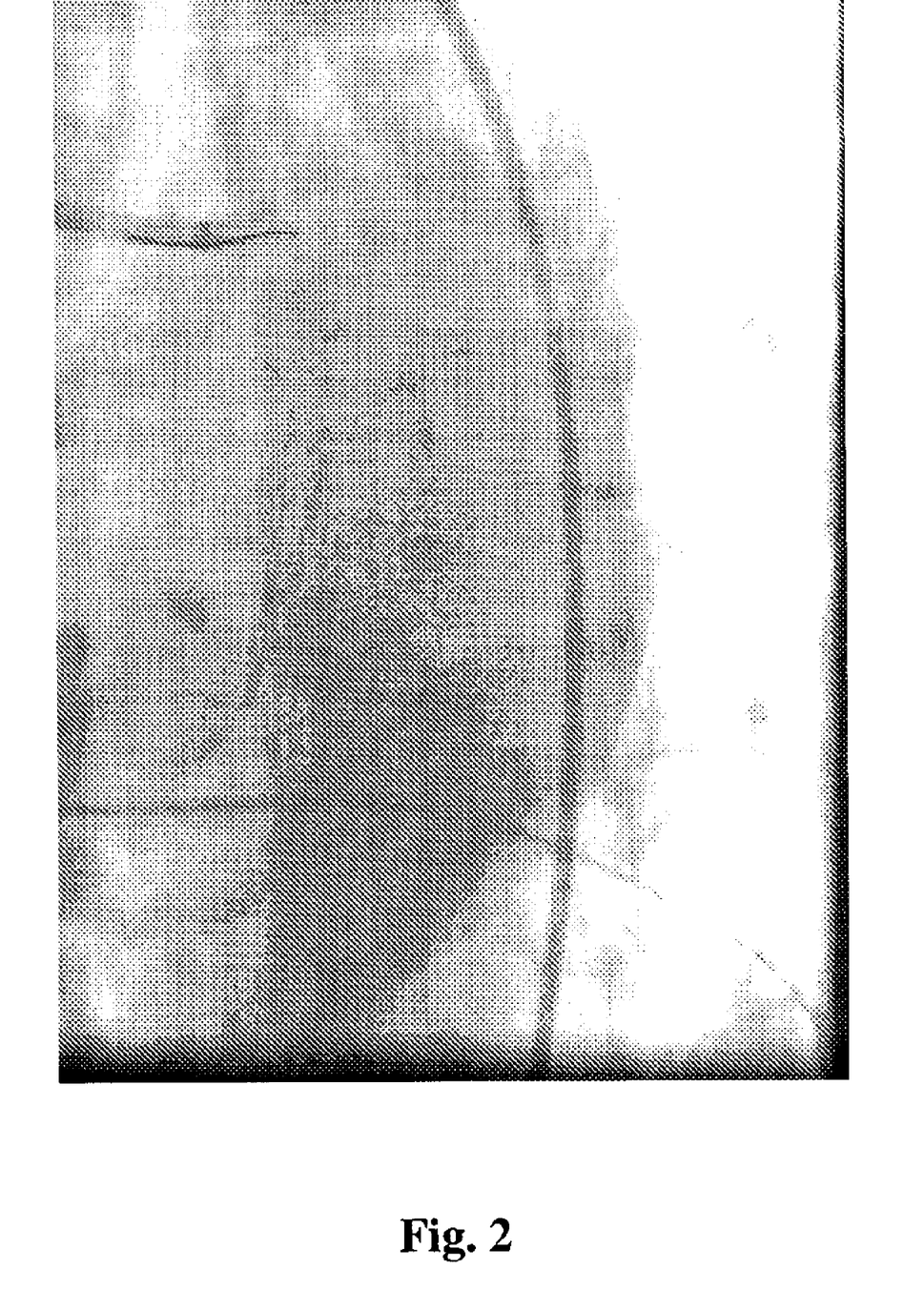
FIG. 2 is an x-ray image of an operating region in a subject, showing a representation of the identified guide wire superimposed thereon.
Figure 3:
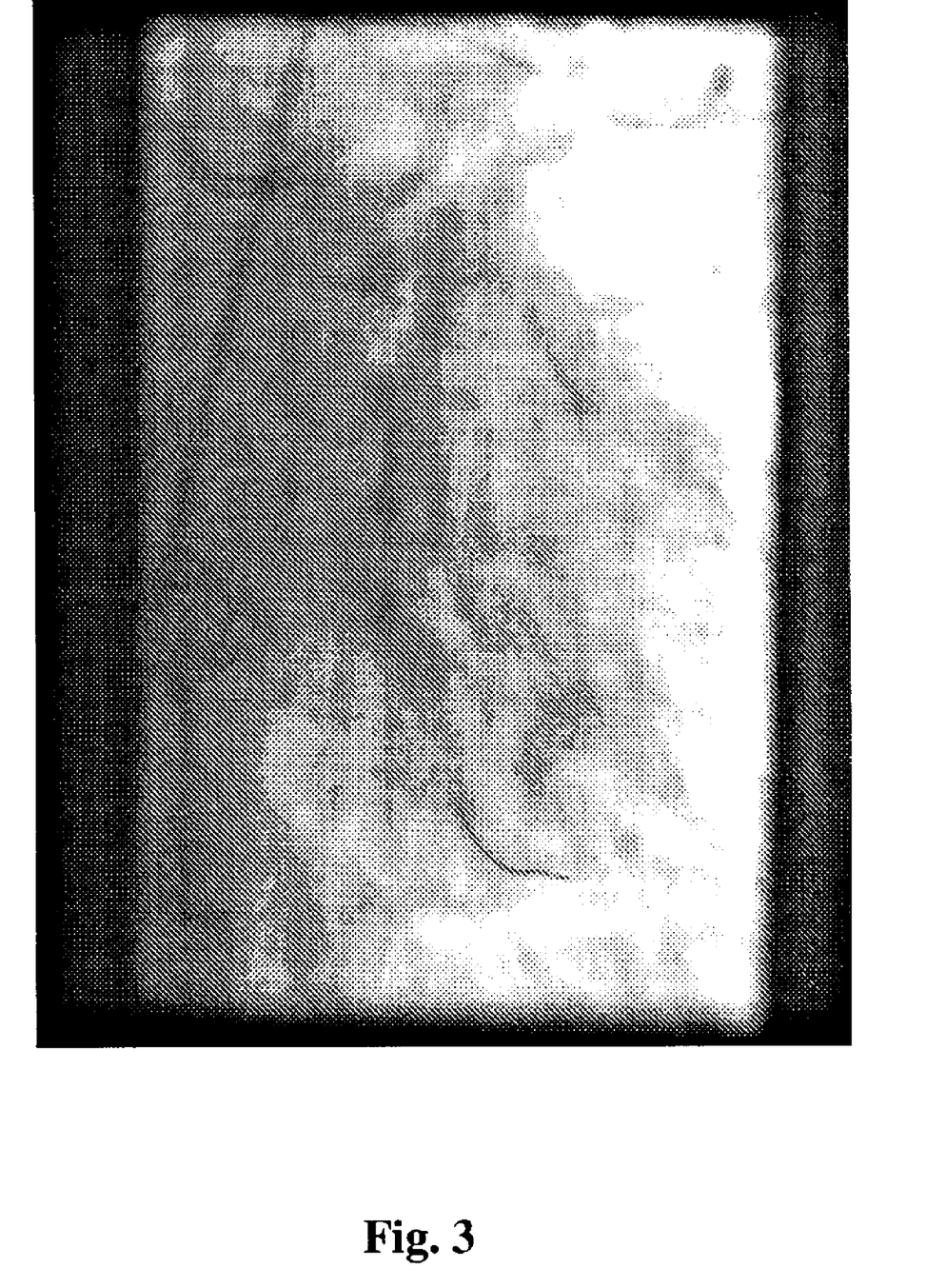
FIG. 3 is an x-ray image of an operating region in a subject, showing a guide wire therein.
Figure 4:
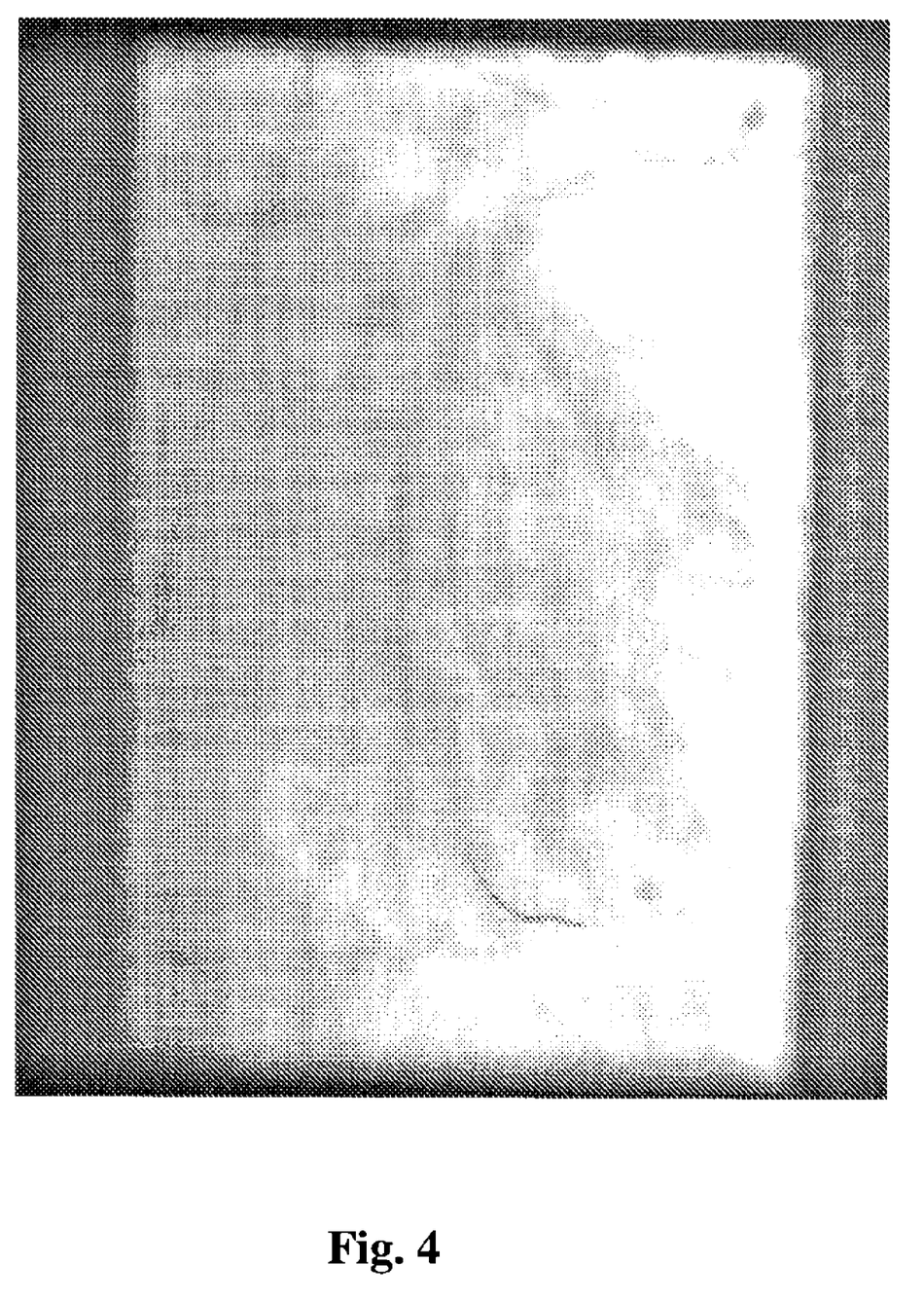
FIG. 4 is an x-ray image of an operating region in a subject, showing a representation of the identified guide wire superimposed thereon.
Figure 5:
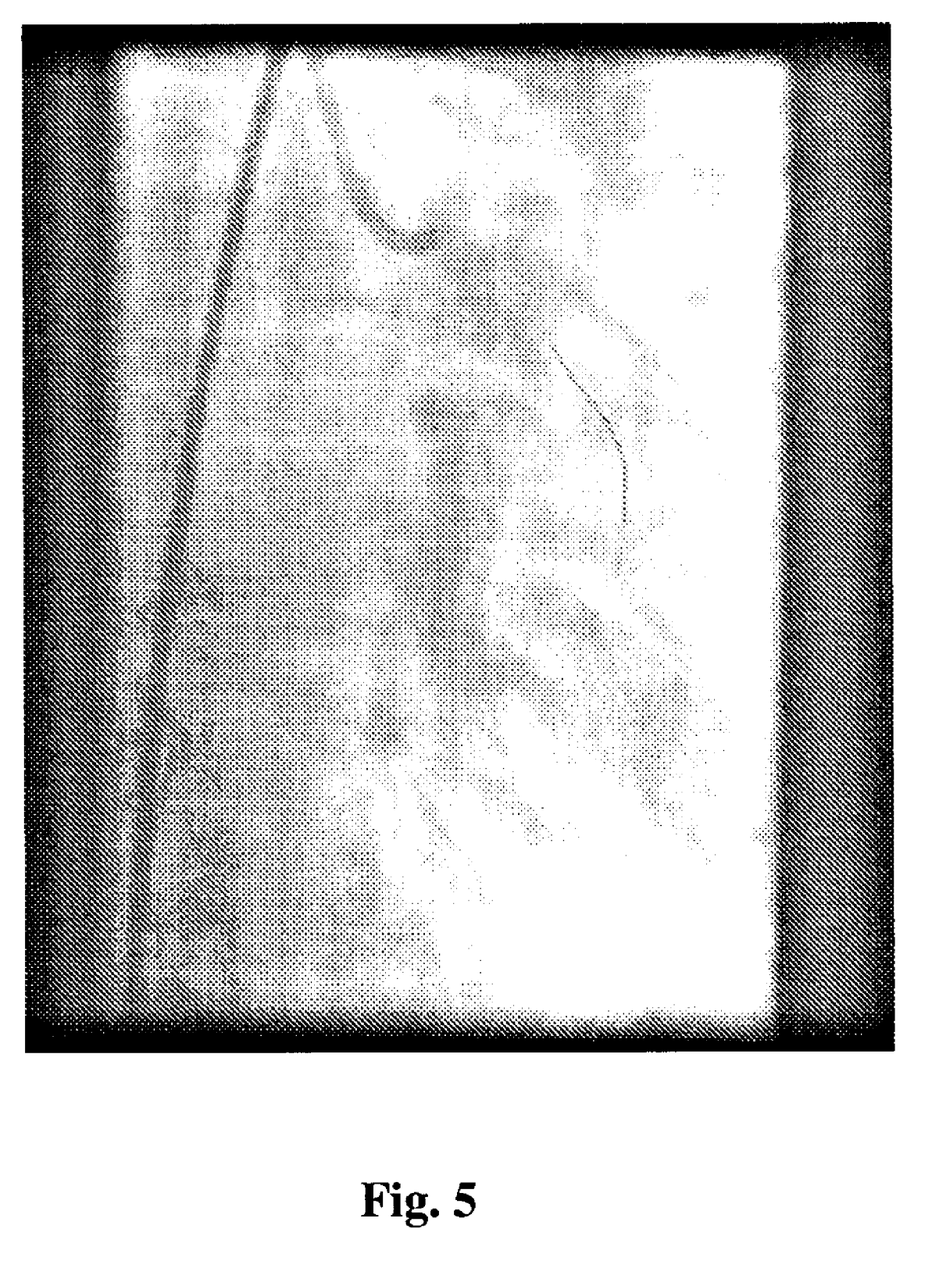
FIG. 5 is an x-ray image of an operating region in a subject, showing a guide wire therein.
Figure 6:
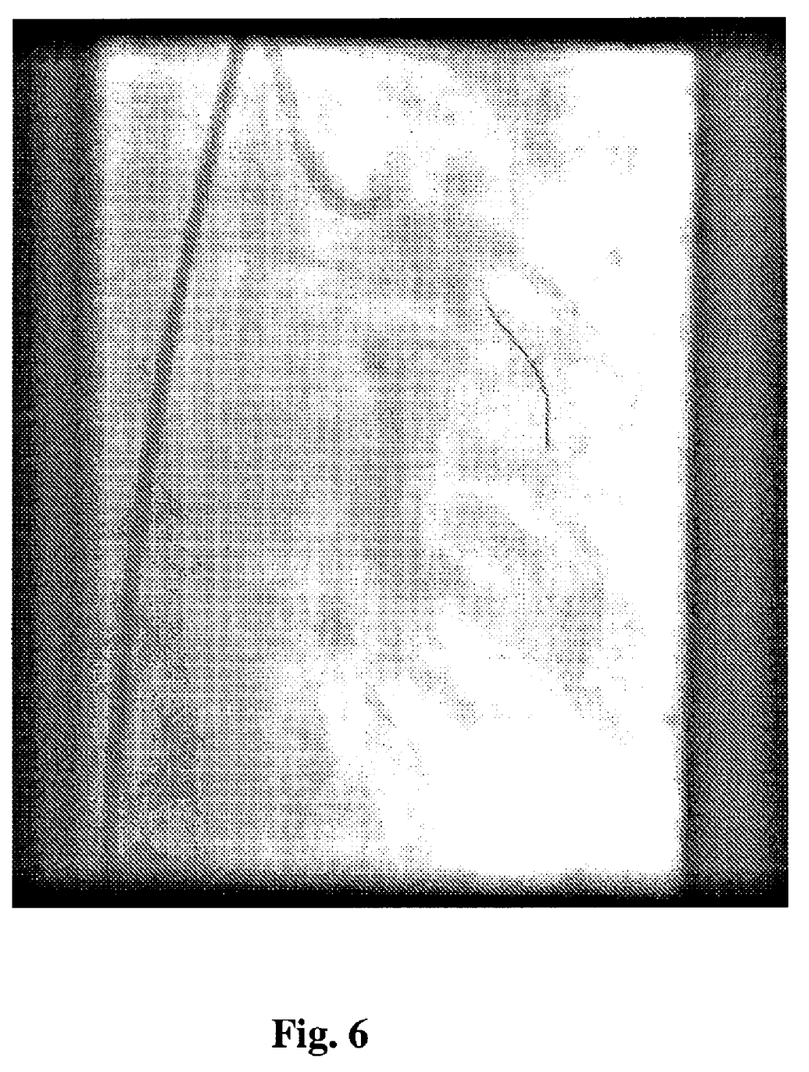
FIG. 6 is an x-ray image of an operating region in a subject, showing a representation of the identified guide wire superimposed thereon

FIGS. 1, 3 and 5 show examples of guide wires in X-ray images. FIGS. 2, 4 and 6 shows the corresponding respective device identification algorithm results with the identified wire marked in red in each case. In FIG. 7, the marked pixels are shown as exaggerated black dots for clarity; this figure illustrates the process of filtering the marked pixels by examining pixel counts in locally centered, similarly shaped regions (in this case, squares) of various sizes.

It can be seen that even in the case of relatively low image contrast, and with the presence of other objects such as guide catheters and ECG leads within the field of view, the desired device (the guide wire) is identified correctly by the image recognition algorithm.

The resulting identified device on the X-ray image can be used to navigate the device around a bend in the path or into a desired branch when a remote navigation system is used, such as for example the Niobe Magnetic Navigation System commercialized by Stereotaxis, Inc., when a desired three dimensional path for navigating the device through a body lumen such as a blood vessel has been defined. Such a three dimensional path through a body lumen could be identified with the suitable use of contrast injections in multiple X-ray views. Other remote actuation technologies could be used to steer the device in alternate embodiments.

When three dimensional path information is available to such a computerized navigation system, a single X-ray plane can suffice to identify the location of the device distal tip since the device is constrained to lie within the body lumen. In the case when there is no body lumen constraint, a computational model of the device could be used together with single-plane image-based device localization to estimate the location of the distal device tip in three dimensions.

The navigation can proceed as described for instance in co-pending patent application No. U.S. patent application Ser. No. 10/448,273, filed May 29, 2003 (Publication No. 20040068173, published Apr. 8, 2004), the disclosure of which is incorporated herein by reference, in either discrete or continuous fashion. In a continuous mode of operation, a Cine X-ray sequence consisting of multiple image frames is used to successively identify the device and its motion, and appropriate actuation control variables can be applied in succession to bend the device tip suitably in order to effectively navigate it. An example of actuation is the application of a magnetic field in the case of a Magnetic Navigation System. In a discrete mode of operation, single frames are used to identify the current location of the device and a discrete actuation control variable change is applied for device steering before advancing it.

While the examples above discuss guide wire devices, a wide range of medical devices such as catheters, Electrophysiology catheters, microcatheters, balloon catheters, stents, and a broad variety of interventional surgical devices can be identified by making suitable modifications to the algorithms described herein as would be known to those skilled in the art, without departing from the spirit and scope of the present invention.

Applications include remote or computerized navigation and accurate placement of devices such as stents for therapeutic purposes within a desired anatomical region such as a lesion in an artery.

Devices could be designed with customized radiopacity properties and geometry such as image contrast or other geometric attributes for the present image recognition method to function optimally. As an example, a microcatheter could have a defined length of radio-opaque marker material embedded in its wall, or even a patterned shape such as a series of radio-opaque rings. The image recognition algorithm could be tuned to specifically identify such a patterned shape in an image based on the teachings and principles described herein.

What is claimed is:

1. A method of identifying an elongate medical device in a two-dimensional image of an operating region, the method comprising:
   (a) filtering pixels meeting a predetermined intensity requirement of a pixel intensity below a predetermined threshold for linear scaling;
   (b) dividing the filtered pixels into groups that form segments of contiguous pixels having at least a predetermined length; and
   (c) selecting from the groups a group that forms a segment of contiguous pixels corresponding to the medical device, where the selected segment of contiguous pixels has a pixel intensity below the predetermined threshold as compared to the intensity of adjacent pixel segments.

2. The method according to claim 1 wherein dividing the filtered pixels into groups of contiguous pixels comprises grouping pixels that are within a predetermined number of pixels of one another.

3. The method according to claim 2 wherein the predetermined number of pixels is between 2 and 8.

4. A method of identifying an elongate medical device in a two-dimensional image of an operating region, the method comprising:
   (a) determining representative pixels, wherein the representive pixels are determined by scanning the pixels of the two-dimensional image of the operating region for a first segment of contiguous pixels, of predetermined length whose average pixel intensity is below a predetermined threshold as compared to the average intensity of segments of a second pre-determined length on either side of the first segment, and marking a pixel on each segment as a representative pixel;
   (b) filtering a set of representative pixels from the segments of pixels meeting a predetermined intensity requirement for linear scaling:
   (c) dividing the filtered pixels into groups of contiguous pixels: and
   (d) selecting from the groups a group corresponding to the medical device.

5. The method according to claim 4 wherein the scanning step comprises scanning the image by row and by column.

6. The method according to claim 4 wherein the step of selecting from the groups a group corresponding to the medical device comprises selecting the group with the largest number of contiguous pixels.

7. The method according to claim 6 wherein the step of selecting from the groups further comprises confirming the correct identification of device by determining the transverse dimension of the identified device from the image and comparing it with the known transverse dimension of the device.

8. The method according to claim 6 wherein the step of selecting from the groups further comprises confirming the correct identification of device by determining the length of the identified device from the image and comparing it with the known length of the device.

9. The method according to claim 6 wherein the step of selecting from the groups further comprises confirming the correct identification of device by determining the configuration of the device from the image and comparing it with possible configurations of the device.

10. A method of identifying an elongate medical device in a two-dimensional image of an operating region, the method comprising:
    (a) filtering a set of representative pixels from segments of pixels meeting a predetermined intensity requirement for linear scaling, wherein the filtering step comprises determining the number of representative pixels in several different sized regions of similar shape centered about each representative pixel and comparing the determined number of points in the different sized regions for linear scaling;
    (b) dividing the filtered pixels into groups of contiguous pixels; and
    (c) selecting from the groups a group corresponding to the medical device.

11. The method according to claim 10 wherein determining the number of pixels in several different sized regions of similar shape centered about each representative pixel comprises determining the number of points in at least three differently sized regions.

12. The method according to claim 11 where the shape of each region is rectangular.

13. The method according to claim 12 wherein the shape of each region is square.

14. The method according to claim 11 wherein the step of comparing the determined number of points in the different sized regions for linear scaling, comprises comparing at least two pairs of different sized regions for each marked pixel.

15. The method according to claim 14 wherein a scaling factor is determined for each size of region by dividing the number of points for each region by a dimension representing the size of the region, and wherein the scaling factors are compared within a predetermined error factor.

16. A method of identifying an elongate medical device in a two-dimensional image of an operating region, the method comprising:
    (a) scanning the pixels of the two-dimensional image of the operating region for specific segments of contiguous pixels of a first predetermined length whose average pixel intensity is below a pre-determined threshold as compared to the average intensity of segments of a second pre-determined length on either side of the specific segment and marking a location on each specific segment;

(b) filtering the marked pixels by checking the numbers of points in multiple regions of similar shape centered about each marked pixel for a linear scaling pattern;
(c) dividing the marked, filtered pixels into groups of contiguous pixels, such that each group defines a connected region, and
(d) selecting from the groups a group corresponding to the medical device.

17. The method according to claim 16 wherein the scanning step comprising scanning the image by row and by column.

18. The method according to claim 16 wherein the filtering step comprises determining the number of marked pixels in several different sized regions of similar shape centered about each marked pixel and comparing the determined number of points in the different sized regions for linear scaling.

19. The method according to claim 18 wherein determining of the number of marked pixels in several different sized regions centered about each marked pixel comprises determining the number of points in at least three differently sized regions.

20. The method according to claim 19 wherein the step of comparing the determined number of marked pixels in the different sized regions for linear scaling, comprises comparing at least two pairs of different sized regions for each marked pixel.

21. The method according to claim 20 wherein a scaling factor is determined for each size of region by dividing the number of points for each region by a dimension representing the size of the region, and wherein the scaling factors are compared within a predetermined error factor.

22. The method according to claim 16 wherein dividing the filtered pixels into groups of contiguous pixels comprises grouping pixels that are within a predetermined number pixels of one another.

23. The method according to claim 22 wherein the predetermined number of pixels is between 2 and 8.

24. The method according to claim 16 wherein the step of selecting from the groups a group corresponding to the medical device comprises selecting the group with the largest number of contiguous pixels.

25. The method according to claim 24 wherein the step of selecting from the groups further comprises confirming the correct identification of device by determining the transverse dimension of the identified device from the image and comparing it with the known transverse dimension of the device.

26. The method according to claim 24 wherein the step of selecting from the groups further comprises confirming the correct identification of device by determining the length of the identified device from the image and comparing it with the known length of the device.

27. The method according to claim 24 wherein the step of selecting from the groups further comprises confirming the correct identification of device by determining the configuration of the device from the image and comparing it with possible configurations of the device.

28. A method of identifying an elongate medical device in a two-dimensional image of an operating region, the method comprising:
(a) scanning the pixels of the two-dimensional image of the operating region for specific segments of contiguous pixels of a first pre-determined length whose average pixel intensity is below a pre-determined threshold as compared to the average intensity of segments of a second pre-determined length on either side of the specific segment and marking a location on each specific segment;
(b) filtering the marked pixels by checking the numbers of points in multiple regions of similar shape centered about each marked pixel for a linear scaling pattern;
(c) dividing the image into a plurality of multi-pixel cells, and identifying the distribution centroid of cells that have a distribution of at least a predetermined number of marked, filtered pixels;
(d) dividing the identified centroids into groups of contiguous points, such that each group defines a connected region, and
(d) selecting from the groups a group corresponding to the medical device.

29. The method according to claim 28 wherein the scanning step comprising scanning the image by row and by column.

30. The method according to claim 28 wherein the filtering step comprises determining the number of marked pixels in several different sized regions centered about each marked pixel and comparing the determined number of points in the different sized regions for linear scaling.

31. The method according to claim 30 wherein determining the number of marked pixels in several different sized regions centered about each marked pixels comprises determining the number of points in at least three differently sized regions.

32. The method according to claim 31 wherein the step of comparing the determined number of points in the different sized regions for linear scaling, comprises comparing at least two pairs of different sized regions for each marked pixel.

33. The method according to claim 32 wherein a scaling factor is determined for each size of region by dividing the number of points for each region by a dimension representing the size of the region, and wherein the scaling factors are compared within a predetermined error factor.

34. The method according to claim 28 wherein dividing the identified centroids into groups of contiguous points comprises grouping points that are within a predetermined distance of one another.

35. The method according to claim 34 wherein the pre-determined distance corresponds to a length of between 4 and 25 pixel units.

36. The method according to claim 28 wherein the step of selecting from the groups a group corresponding to the medical device comprises selecting the group with the largest number of points.

37. The method according to claim 36 wherein the step of selecting from the groups further comprises confirming the correct identification of device by determining the transverse dimension of the identified device from the image and comparing it with the known transverse dimension of the device.

38. The method according to claim 36 wherein the step of selecting from the groups further comprises confirming the correct identification of device by determining the length of the identified device from the image and comparing it with the known length of the device.

39. The method according to claim 38 wherein the step of selecting from the groups further comprises confirming the correct identification of device by determining the configuration of the device from the image and comparing it with possible configurations of the device.

* * * * *